(12) United States Patent
Hunstable

(10) Patent No.: US 10,284,029 B2
(45) Date of Patent: *May 7, 2019

(54) BRUSHED ELECTRIC MOTOR/GENERATOR

(71) Applicant: Linear Labs, Inc., Granbury, TX (US)

(72) Inventor: Fred E. Hunstable, Granbury, TX (US)

(73) Assignee: LINEAR LABS, LLC, Granbury, TX (US)

( * ) Notice: Subject to any disclaimer, the term of this patent is extended or adjusted under 35 U.S.C. 154(b) by 288 days.

This patent is subject to a terminal disclaimer.

(21) Appl. No.: 14/866,787

(22) Filed: Sep. 25, 2015

(65) Prior Publication Data

US 2016/0094096 A1 Mar. 31, 2016

Related U.S. Application Data

(63) Continuation-in-part of application No. 14/608,232, filed on Jan. 29, 2015, now abandoned, and a continuation-in-part of application No. 13/848,048, filed on Mar. 20, 2013, now Pat. No. 9,419,483.

(60) Provisional application No. 62/055,612, filed on Sep. 25, 2014, provisional application No. 62/055,615, filed on Sep. 25, 2014, provisional application No.
(Continued)

(51) Int. Cl.
| | |
|---|---|
| H02K 1/17 | (2006.01) |
| H02K 3/04 | (2006.01) |
| H02K 1/22 | (2006.01) |
| H02K 23/04 | (2006.01) |
| H02K 23/30 | (2006.01) |
| H02K 23/40 | (2006.01) |

(52) U.S. Cl.
CPC ............... *H02K 1/17* (2013.01); *H02K 1/223* (2013.01); *H02K 3/04* (2013.01); *H02K 23/04* (2013.01); *H02K 23/30* (2013.01); *H02K 23/40* (2013.01)

(58) Field of Classification Search
CPC .. H02K 1/12; H02K 1/17; H02K 1/30; H02K 3/04; H02K 21/12; H02K 21/24
See application file for complete search history.

(56) References Cited

U.S. PATENT DOCUMENTS

| 2,703,370 A | 3/1955 | Sverre |
| 3,300,663 A | 1/1967 | O |

(Continued)

FOREIGN PATENT DOCUMENTS

| CN | 2226352 Y | 5/1996 |
| CN | 2452204 Y | 10/2001 |

(Continued)

OTHER PUBLICATIONS

Australia Exam Report, dated May 10, 2016, re Patent Application No. 2013235132; 3 pages.
(Continued)

*Primary Examiner* — Tran N Nguyen
(74) *Attorney, Agent, or Firm* — Bill R. Naifeh

(57) ABSTRACT

Disclosed are various embodiments for an improved generator/motor and a method of generating current, the method comprising providing a circular rotation path, generating a concentrated magnetic field around a portion of the circular rotation path; rotating a coil along the circular path and through the concentrated magnetic field; generating current within the coil as a result of the rotating, and extracting the current from the coil.

19 Claims, 9 Drawing Sheets

Related U.S. Application Data

62/056,389, filed on Sep. 26, 2014, provisional application No. 61/613,022, filed on Mar. 20, 2012.

(56) References Cited

U.S. PATENT DOCUMENTS

| | | | |
|---|---|---|---|
| 3,469,133 A | 9/1969 | Stcherbatcheff | |
| 3,895,245 A | 7/1975 | Fred | |
| 3,979,619 A | 9/1976 | Whiteley | |
| 4,237,396 A | 12/1980 | Blenkinsop et al. | |
| 4,388,547 A | 6/1983 | Gruber | |
| 4,441,043 A | 4/1984 | DeCesare | |
| 4,488,075 A * | 12/1984 | DeCesare | H02K 21/12 310/114 |
| 4,547,713 A | 10/1985 | Langley et al. | |
| 4,629,921 A | 12/1986 | Gavaletz | |
| 4,814,651 A * | 3/1989 | Elris | H02K 5/136 310/156.22 |
| 5,004,944 A * | 4/1991 | Fisher | H02K 1/02 310/156.26 |
| 5,099,158 A | 3/1992 | Stuart et al. | |
| 5,594,289 A | 1/1997 | Minato | |
| 5,691,589 A | 11/1997 | Keim et al. | |
| 5,886,450 A | 3/1999 | Kuehnle | |
| 5,962,947 A | 10/1999 | Suzuki et al. | |
| 5,977,684 A * | 11/1999 | Lin | H02K 21/12 310/178 |
| 6,054,834 A | 4/2000 | Ha | |
| 6,104,108 A | 8/2000 | Hazelton et al. | |
| 6,324,574 B1 | 11/2001 | Gong | |
| 6,388,352 B1 | 5/2002 | Huang | |
| 6,531,799 B1 | 3/2003 | Miller | |
| 6,664,689 B2 * | 12/2003 | Rose | H02K 21/12 310/156.32 |
| 6,664,704 B2 | 12/2003 | Calley | |
| 6,774,591 B2 | 8/2004 | Arimitsu et al. | |
| 6,803,691 B2 | 10/2004 | Rose | |
| 6,806,607 B2 | 10/2004 | Lau | |
| 6,891,299 B2 | 5/2005 | Coupart et al. | |
| 6,924,574 B2 | 8/2005 | Qu | |
| 6,924,579 B2 | 8/2005 | Calley | |
| 6,930,421 B2 | 8/2005 | Wise | |
| 6,930,422 B2 | 8/2005 | Rose | |
| 6,967,424 B2 | 11/2005 | Popov | |
| 6,979,925 B2 | 12/2005 | Schwamm | |
| 7,049,722 B2 * | 5/2006 | Rose | H02K 21/12 310/156.01 |
| 7,233,088 B2 | 6/2007 | Wise | |
| 7,279,818 B1 | 10/2007 | Wise | |
| 7,315,103 B2 | 1/2008 | Qu et al. | |
| 7,348,703 B2 | 3/2008 | Bojiuc | |
| 7,554,241 B2 * | 6/2009 | Rao | H02K 1/12 310/203 |
| 7,732,973 B2 | 6/2010 | Bojiuc | |
| 7,755,244 B2 * | 7/2010 | Ley | H02K 1/148 310/201 |
| 7,765,905 B2 | 8/2010 | Trumper et al. | |
| 7,791,242 B2 | 9/2010 | Bojiuc | |
| 7,834,503 B2 | 11/2010 | Bojiuc | |
| 7,898,134 B1 | 3/2011 | Shaw | |
| 8,008,821 B2 | 8/2011 | Calley et al. | |
| 8,063,528 B2 | 11/2011 | Toot | |
| 8,074,922 B2 | 12/2011 | Bojiuc | |
| 8,159,104 B1 | 4/2012 | Bojiuc | |
| 8,232,695 B2 | 7/2012 | Bojiuc | |
| 8,288,916 B2 | 10/2012 | Quere | |
| 8,362,731 B2 | 1/2013 | Smith et al. | |
| 8,400,037 B2 | 3/2013 | Wojtowicz | |
| 8,415,848 B2 | 4/2013 | Calley et al. | |
| 8,598,754 B2 | 12/2013 | Lacour | |
| 8,912,699 B2 * | 12/2014 | Kuntz | H02K 53/00 310/156.35 |
| 9,219,962 B2 * | 12/2015 | Hunstable | H04R 9/02 |
| 9,419,483 B2 * | 8/2016 | Hunstable | H02K 1/17 |
| RE46,449 E | 6/2017 | Bojiuc | |
| 9,729,016 B1 * | 8/2017 | Hunstable | H02K 1/06 |
| 9,825,496 B2 | 11/2017 | Hunstable | |
| 2003/0025417 A1 | 2/2003 | Rose | |
| 2004/0027022 A1 | 2/2004 | Weir | |
| 2004/0061397 A1 | 4/2004 | Rose | |
| 2004/0194286 A1 | 10/2004 | Rose | |
| 2004/0195932 A1 | 10/2004 | Rose | |
| 2004/0195933 A1 | 10/2004 | Rose | |
| 2004/0232800 A1 | 11/2004 | Seguchi et al. | |
| 2005/0194855 A1 | 9/2005 | Hasebe | |
| 2006/0038454 A1 | 2/2006 | Bojiuc | |
| 2006/0273686 A1 | 12/2006 | Edelson et al. | |
| 2007/0228860 A1 | 10/2007 | Rao | |
| 2008/0278019 A1 | 11/2008 | Lu et al. | |
| 2009/0224627 A1 | 9/2009 | Hino et al. | |
| 2009/0224628 A1 | 9/2009 | Hiwaki et al. | |
| 2009/0261675 A1 | 10/2009 | Hsiao et al. | |
| 2010/0289365 A1 | 11/2010 | Bando et al. | |
| 2011/0187222 A1 | 8/2011 | Li et al. | |
| 2013/0249343 A1 | 9/2013 | Hunstable | |
| 2014/0070651 A1 * | 3/2014 | Gerfast | H02K 21/14 310/114 |
| 2014/0191612 A1 | 7/2014 | Eurocopter et al. | |
| 2015/0001976 A1 | 1/2015 | Hunstable | |
| 2015/0137647 A1 | 5/2015 | Hunstable | |
| 2015/0171694 A1 | 6/2015 | Walsh | |
| 2016/0020652 A1 | 1/2016 | Hunstable | |
| 2016/0380496 A1 | 12/2016 | Hunstable | |
| 2017/0237325 A1 | 8/2017 | Hunstable | |
| 2018/0131244 A1 | 5/2018 | Hunstable | |
| 2018/0212486 A1 | 7/2018 | Hunstable | |
| 2018/0278134 A1 | 9/2018 | Hunstable | |
| 2018/0331593 A1 | 11/2018 | Hunstable | |

FOREIGN PATENT DOCUMENTS

| | | |
|---|---|---|
| DE | 102010024344 A1 | 12/2011 |
| EP | 1990894 A2 | 11/2008 |
| JP | S51-133709 | 11/1976 |
| JP | S54-92305 U | 12/1977 |
| JP | 61173658 A | 8/1986 |
| JP | S61-144782 U | 9/1986 |
| JP | 2002369473 A | 12/2002 |
| KR | 101276633 B1 | 6/2013 |
| WO | 2008096913 A1 | 8/2008 |
| WO | 2011032675 A2 | 3/2011 |
| WO | 2016164818 A1 | 10/2016 |
| WO | 2017003955 A1 | 1/2017 |
| WO | 2017070403 A1 | 4/2017 |
| WO | 2018045360 A1 | 3/2018 |

OTHER PUBLICATIONS

Chinese Office Action, dated Jul. 20, 2016, re Patent Application No. 201380022180.7; 9 pages.
Japanese Office Action, dated Jan. 25, 2017, regarding Japanese Patent Application No. 2015-501894.
International Search Report and Written Opinion, dated Jan. 9, 2017, by the ISA/US, re PCT/US2016/057999.
Chinese Office Action, dated Apr. 19, 2017, re CN Patent Application No. 201380022180.7.
Notice of Allowance, dated Jun. 27, 2017, by the USPTO, re U.S. Appl. No. 15/492,529.
Office Action, dated Jan. 6, 2017, by the USPTO, re U.S. Appl. No. 14/490,656.
Ex parte Quayle Action, dated Jun. 6, 2017, by the USPTO, re U.S. Appl. No. 14/490,656.
Office Action, dated Jul. 21, 2017, by the USPTO, re U.S. Appl. No. 15/413,228.
Office Action dated Oct. 2, 2017, by the USPTO, re U.S. Appl. No. 14/866,788.
Aydin, Metin, et al., "Design and 3D Electromagnetic Field Analysis of Non-slotted and Slotted TORUS Type Axial Flux Surface Mounted Permanent Magnet Disc Machines," IEEE International Electric Machines and Drives Conference, Jun. 17-20, 2001, pp. 645-651.

(56) References Cited

OTHER PUBLICATIONS

Aydin, Metin, et al., "Performance Evaluation of an Axial Flux Consequent Pole PM Motor Using Finite Element Analysis," IEEE International Electric Machines and Drives Conference, vol. 3, Jun. 1-4, 2003, pp. 1682-1687.

Huang, Surong, et al., "TORUS Concept Machines: Pre-Prototyping Design Assessment for Two Major Topologies," IEEE Industry Applications Conference, vol. 3, Sep. 30-Oct. 4, 2001, pp. 1619-1625.

International Search Report and Written Opinion of the International Searching Authority from PCT/US2013/033198, dated Aug. 8, 2014, 8 pages.

International Search Report and Written Opinion of the ISA, dated Aug. 18, 2016, re PCT/US2016/026776.

International Search Report and Written Opinion, dated Nov. 3, 2016, by the ISA/RU, re PCT/US2016/039673.

Office Action, dated Aug. 25, 2015, by the USPTO, re U.S. Appl. No. 13/848,048.

Final Office Action, dated Feb. 17, 2016, by the USPTO, re U.S. Appl. No. 13/848,048.

Notice of Allowance, dated Jun. 7, 2016, by the USPTO, re U.S. Appl. No. 13/848,048.

Pre-Interview First Office Action, dated Apr. 15, 2015, by the USPTO, re U.S. Appl. No. 14/608,232.

First Action Interview—Office Action, dated Nov. 13, 2015, by the USPTO, re U.S. Appl. No. 14/608,232.

Final Office Action, dated Feb. 25, 2016, by the USPTO, re U.S. Appl. No. 14/608,232.

Notice of Allowance, dated Jun. 27, 2016, by the USPTO, re U.S. Appl. No. 14/608,232.

Notice of Allowance, dated Nov. 2, 2016, by the USPTO, re U.S. Appl. No. 14/608,232.

Final Office Action, dated Mar. 9, 2018, by the USPTO, re U.S. Appl. No. 15/413,228.

International Search Report and Written Opinion, dated Mar. 15, 2018, by the ISA/RU, re PCT International Application No. PCT/US2017/049981.

Notice of Allowance, dated Apr. 13, 2018, by the USPTO, re U.S. Appl. No. 14/866,788.

Office Action, dated May 18, 2018, by the USPTO, re U.S. Appl. No. 15/657,173.

Office Action, dated Jun. 27, 2018, by the USPTO, re U.S. Appl. No. 15/008,431.

Notice of Allowance, dated May 2, 2018, by the USPTO, re U.S. Appl. No. 14/866,788.

Notice of Allowance, dated Aug. 13, 2018, by the USPTO, re U.S. Appl. No. 14/866,788.

Office Action, dated Sep. 19, 2018, by the USPTO, re U.S. Appl. No. 15/413,228.

EP Exam Report, dated Apr. 18, 2018, by the EPO, re EP App No. 13714168.5.

Extended EP Search Report, dated Oct. 26, 2018, re EP Patent App No. 167774215.

EP Official Action, dated Nov. 13, 2018, by the EPO, re EP App No. 16777421.5.

Notice of Allowance, dated Nov. 28, 2018, by the USPTO, re U.S. Appl. No. 15/657,173.

Notice of Allowance, dated Dec. 12, 2018, by the USPTO, re U.S. Appl. No. 14/866,788.

EP Exam Report, dated Oct. 10, 2018, by the EPO, re EP App No. 13714168.5, dated Oct. 26, 2018.

Indian Exam Report, dated Nov. 19, 2018, by IP India, re IN App No. 8335/DELNP/2014.

* cited by examiner

BRUSHED ELECTRIC MOTOR/GENERATOR

This application claims the benefit of the filing date of U.S. patent application Ser. No. 14/608,232, entitled "An Improved Brushless Electric Motor/Generator," filed on Jan. 29, 2015. This application also claims the benefit of the filing date of U.S. provisional patent application Ser. No. 62/055,612, entitled "An Improved DC Electric Motor/Generator with Enhanced Permanent Magnetic Flux Densities," filed on Sep. 25, 2014. This application also claims the benefit of the filing date of U.S. provisional patent application Ser. No. 62/055,615, entitled "An Improved DC Electric Motor/Generator with Enhanced Permanent Magnetic Flux Densities," filed on Sep. 25, 2014. This application also claims the benefit of the filing date of U.S. provisional patent application Ser. No. 62/056,389, entitled "An Improved DC Electric Motor/Generator with Enhanced Permanent Magnetic Flux Densities," filed on Sep. 26, 2014. This application is also a continuation-in-part of the commonly owned U.S. application Ser. No. 13/848,048, entitled "An Improved DC Electric Motor/Generator with Enhanced Permanent Magnetic Flux Densities" filed on Mar. 20, 2013, which claims the benefit of U.S. Provisional Application Ser. No. 61/613,022, filed on Mar. 20, 2012. The disclosures of all of the above applications are hereby incorporated by reference for all purposes.

TECHNICAL FIELD

The invention relates in general to a new and improved electric motor/generator, and in particular to an improved system and method for producing rotary motion from a electro-magnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. The geometric shapes of the magnetic flux lines produced by moving charge carriers (electric current) are similar to the shapes of the flux lines in an electrostatic field. Magnetic flux passes through most metals with little or no effect, with certain exceptions, notably iron and nickel. These two metals, and alloys and mixtures containing them, are known as ferromagnetic materials because they concentrate magnetic lines of flux. Areas of greatest field strength or flux concentration are known as magnetic poles.

In a traditional electric motor, a central core of tightly wrapped current carrying material creates magnetic poles (known as the rotor) which spins or rotates at high speed between the fixed poles of a magnet (known as the stator) when an electric current is applied. The central core is typically coupled to a shaft which will also rotate with the rotor. The shaft may be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

Motors and generators used today produce or utilize a sinusoidal time varying voltage. This waveform is inherent to the operation of these devices.

In most conventional motors, both linear and rotating, enough power of the proper polarity must be pulsed at the right time to supply an opposing (or attracting) force at each pole segment to produce a particular torque. In conventional motors at any given instant only a portion of the coil pole pieces is actively supplying torque.

With conventional motors a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM. However output is a sinusoidal output with the same losses as shown in conventional electric motors.

In traditional generators and motors, the pulsed time varying magnetic fields produces undesired effects and losses, i.e. Iron Hystersis losses, Counter-EMF, inductive kickback, eddy currents, inrush currents, torque ripple, heat losses, cogging, brush losses, high wear in brushed designs, commutation losses and magnetic buffeting of permanent magnets. In many instances, complex controllers are used in place of mechanical commutation to address some of these effects.

In motors and generators that utilize permanent magnets it is desirable to increase magnetic flux densities to achieve more efficient operation. Most permanent magnet motor/generators used today rely on permanent magnets such as Neodymium magnets. These magnets are the strongest of the man made magnetic materials. Due to their strategic value to industry and high costs it is desirable to increase flux densities without relying on a breakthrough in material composition of these magnets or manufacturing high density special purpose magnet shapes and sizes.

In motors or generators, some form of energy drives the rotation and/or movement of the rotor. As energy becomes more scarce and expensive, what is needed are more efficient motors and generators to reduce energy costs.

SUMMARY

In response to these and other problems, there is presented various embodiments disclosed in this application, including methods and systems of increasing flux density by permanent magnet manipulation. Specifically, methods and systems of increasing flux density utilizing commercially available shapes or sizes that can be chosen based on lower cost rather than flux density. Also described are methods of producing mechanical power by moving a coil/s coupled to a core into a magnet assembly with an increased flux density or producing an electrical output power when the coils are mechanically forced through the magnetic assembly with an increased flux density. In certain aspects, within the magnetic cylinder or magnet assembly magnetic flux lines are created and increased by the configuration of permanent magnets or electromagnets and are restrained within the magnetic cylinder or magnet assembly until exiting at predetermined locations.

In certain aspects presented herein, non-pulsating or non-sinusoidal DC current is applied to the power terminals which produces a Lorentz force at each length of coil conductor. This force is applied continuously throughout the entire rotation of the rotor hub without variations in amplitude or interruptions in output power. There are no pole pieces to provide magnetic attraction or repulsion consequently, there is reduced torque ripple, no pole piece polarity reversals and no interruptions in power output thus producing more efficient output than traditional motors When certain aspects of the disclosed embodiments are used as a generator non pulsating or non-sinusoidal DC current is produced at the power terminals. A voltage is induced through the length of coil conductor and across all coils which induces an output current flow. This output is supplied continuously throughout the entire rotation of the rotor hub without variations in amplitude, polarity reversals, or interruptions in output power. There are no pole pieces to provide magnetic attraction or repulsion which produces a current output more efficiently than traditional generators.

Certain aspects of the disclosure reduces or eliminates the undesired effects and losses of traditional generators and motors discussed above, including Iron Hystersis losses, Counter-EMF, inductive kickback, eddy currents, inrush currents, torque ripple, heat losses, cogging, brush losses, sparking and high wear in brushed designs, commutation losses and magnetic buffeting of permanent magnets.

In summary, certain aspects of the various disclosed embodiments may provide the following benefits:

Unlike conventional brush rectified or PWM controller motor/generators, the coils in aspects of this invention are in continuous contact with the Permanent Magnet field and thus produce a non-varying continuous torque or output.

Complex PWM drives and controllers, commutators, etc (and the associated losses) may not be not required since certain aspects of the invention produce and utilize DC current directly.

If automatic speed control for a given load is required, complex position indication is not required. A much simpler RPM indication and a varying voltage/current relationship is all that is required to control speed.

Using the magnetic cylinder/single pole magnet assembly concept utilizing permanent magnets an otherwise unachievable, extremely strong magnetic field is generated without consuming any electrical power.

Though a Counter EMF field is produced by any induced current flow, due to the magnet cylinder and core design there is no direct impact on coil movement that hinders such movement.

Iron Hysteresis losses are essentially eliminated as any particular point on the core only experiences a hysteresis loss twice per revolution.

Eddy current losses are essentially eliminated as the core does not move perpendicular to the flux lines Cogging is also essentially eliminated as the core forces are balanced and equal in all directions There is little inrush current as there is no need to saturate large masses of iron Essentially 100% of the copper windings in the coil interact with virtually 100% of the flux lines to take advantage of Lorentz forces thus there is no wasted copper winding as in conventional motor/generators.

Inductive kickback from the rising and collapsing sinusoidal waveform is eliminated Like other DC motors reversal of torque is simply a reversal of input polarities.

These and other features, and advantages, will be more clearly understood from the following detailed description taken in conjunction with the accompanying drawings.

It is important to note the drawings are not intended to represent the only aspect of the invention.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Most motors and generators used today require or produce a sinusoidal time varying voltage referred to as Alternating Current (AC). When Direct Current is utilized it must first be inverted and pulsed to replicate an AC waveform to produce the desired current or mechanical output. Certain embodiments of the present invention neither produces nor utilizes Alternating Current but instead directly produces or utilizes a non sinusoidal Direct Current without the need for rectification or commutation. This results in the elimination of Alternating Current Losses and results in a more efficient utilization of input or output power. However, certain aspects of the invention may accept any rectified A/C current and thus may be "blind" to input power supply phasing. Thus, simple rectified single phase, two phase, three phase power, etc. are all acceptable for input power depending on the configuration.

Figure 1:
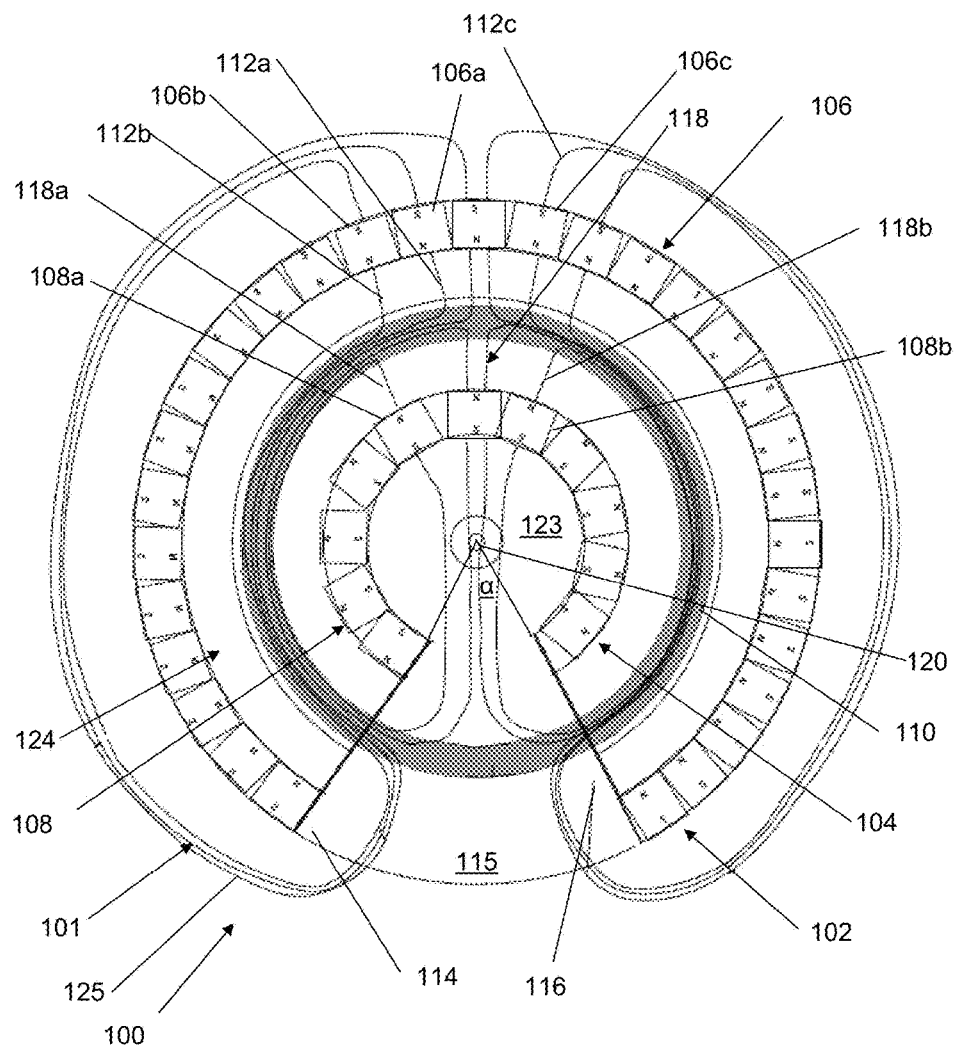
FIG. 1 is a cross-sectional view of a toroidal magnetic cylinder illustrating representative "planar" portions of magnetic flux paths within and around the cylinder with an iron core.

Turning now to FIG. 1, there is a cross-sectional view of one embodiment of a partial toroidal magnetic cylinder 100 illustrating representative planar magnetic flux paths 101 within and around the partial cylinder. These are representative illustrations; actual flux paths are dependent on the material design and specific configuration of the magnets within the cylinder. In certain embodiments, the partial magnetic cylinder 100 comprises an inner cylinder wall 104 positioned around a longitudinal axis 176. An outer cylinder wall 102 is positioned at a lateral distance from the inner cylinder wall 104. The outer cylinder wall 102 and inner cylinder wall 104 may be made with a plurality of magnets. In a lateral section view, such as illustrated in FIG. 1, it can be seen that the outer cylinder wall 102 is comprised of a plurality of magnets 106, comprising individual magnets, such as magnets 106a, 106b, 106c, etc. Similarly, the inner cylinder wall 104 may be comprised with a plurality of magnets 108, comprising individual magnets 108a, 108b, etc. It should be noted that only one polarity of the magnets are utilized within (or facing into) the magnetic cylinder or magnet assembly. For instance in the illustrative embodiment of FIG. 1, the north poles of the magnets 106 are each pointing radially towards a center 120. On the other hand, the north poles of the magnets 108 each point radially away from the center 120 and towards an interior cavity 124 of the partial toroidal magnetic cylinder 100.

In certain embodiments, there may be a central iron core 110, with most of the iron core positioned in the interior cavity 124 between the outer wall 102 and the inner wall 104, however other core materials maybe used when design considerations such as strength, reduction of eddy currents, cooling channels, etc. are considered. In fact, in certain embodiments do not use the central iron core 110.

In certain embodiments, the magnets of the plurality of magnets 106 and magnets 108 may be made of out any suitable magnetic material, such as: neodymium, Alnico alloys, ceramic permanent magnets, or electromagnets. The exact shape and number of magnets or electromagnets will be dependent on the required magnetic field strength or mechanical configuration. The illustrated embodiment is only one way of arranging the magnets, based on certain commercially available magnets. Other arrangements are possible—especially if magnets are manufactured for this specific purpose.

In the embodiment illustrated in FIG. 1, the partial toroidal magnetic cylinder 100 has two open ends 114 and 116. Thus, an open area or throat 115 is formed between the open end 114 and the open end 116.

When the plurality of magnets 106 and 108 are arranged into the outer wall 102 and inner wall 104 to form the partial cylinder 100, the flux lines 101 will form particular patterns as represented in a conceptual manner by the flux lines illustrated in FIG. 1. The actual shape, direction, and orientation of the flux lines 101 depend on factors such as the use of an interior retaining ring, material composition and configuration. For example, the flux line 112a from the magnet 106a of the exterior wall 102 tends to flow from the north pole of the magnet in a perpendicular manner from the face of the magnet around the interior cavity 124 of the cylinder 100, through the iron core 110, exiting through an open end 114 into the open area 115, then flow around the exterior of the partial toroidal cylinder 100, and back to an exterior face of the magnet 106a containing its south pole.

Similarly, the flux line 112b from the magnet 106b of the exterior wall 102 tends to flow from the north pole of the magnet in a perpendicular manner from the face of the magnet around the interior cavity 124 of the cylinder 100, through the iron core 110, exiting through the open end 114 into the open space 115, then flow around the exterior of the cylinder 100, and back to the face of the magnet 106b containing its south pole. Although only a few flux lines 112 are illustrated for purposes of clarity, each successive magnet in the plurality of magnets will produce similar flux lines. Thus, the magnetic flux forces for each successive magnet in the plurality of magnets 106 tend to follow these illustrative flux lines or patterns 112 for each successive magnetic disc in the plurality of magnets 106 until the magnets at the open ends 114 or 116 of the magnetic cylinder 100 are reached.

Magnets on the opposing side of the cylinder 100, such as magnet 106c tend to generate flux lines 112c from the magnet 106c on the exterior wall 102 which tends to flow from the north pole of the magnet in a perpendicular manner from the face around the interior cavity 124 of the cylinder 100, through the iron core 110, exiting through an open end 116 into the open space 115, then flow around the exterior of the cylinder 100, and back to an exterior face of the magnet 106c containing its south pole. Although only a few flux lines 112 on the opposing side of the cylinder 100 are illustrated for purposes of clarity, each successive magnet in the plurality of magnets will produce similar flux lines. As discussed above, in yet other embodiments, the iron core 110 is not necessary. In embodiments without an iron core, the flux lines will generally flow in a similar manner, but may not be as concentrated as embodiments with an iron core. Thus, in certain embodiments, the iron core may act as a flux concentrator.

In certain embodiments, the interior wall 104 also produces flux lines, such as exemplary flux lines 118. For instance, the flux line 118a from the magnet 108a on the interior wall 104 tends to flow from the north pole in a perpendicular manner from the face of the magnet, around the interior cavity 124 of the cylinder 100, through the iron core 110, out the open end 114 and into the open space 115, then back through the center space 123 formed by the interior wall 104 to the face of the magnet 108a containing its south pole. Similarly, the flux line 118b from the magnet 108b on the interior wall 104 tends to flow from the north pole in a perpendicular manner from the face of the magnet, around the interior wall 104 through the iron core 110, out the open end 116 and into the open space 115, then back through the center space 123 formed by the interior wall 104, then back to the face of the magnet 108b containing its south pole.

The magnetic flux forces for each successive magnet in the plurality of magnets 108 tend to follow these illustrative flux lines or patterns 118 for each successive magnet in the plurality of magnets 108 until the open ends 114 or 116 of the magnetic cylinder 100 are reached. Thus, the flux produced by the magnets of the interior wall 104 of the partial cylinder 100 have an unobstructed path to exit through one of the open ends of the cylinder and return to its opposing pole on the exterior or interior of the cylinder.

In some embodiments, the magnetic flux lines 112 and 118 will tend to develop a stacking effect and the configuration of the exterior magnetic cylinder manipulates the flux lines 101 of the magnets in the magnetic cylinder 100 such that most or all of the flux lines 110 flows out of the open ends 114 and 116 of the cylinder 100.

In conventional configurations, the opposing poles of the magnets are usually aligned longitudinally. Thus, the field flux lines will "hug" or closely follow the surface of the magnets. So, when using conventional power generating/utilization equipment, the clearances must usually be extremely tight in order to be able to act on these lines of force. By aligning like magnetic poles radially with respect to the center 120 of the partial cylinder 100, the magnetic flux lines 112 and 118 tend to stack up as they pass through the center of the magnetic cylinder 110 and radiate perpendicularly from the surface of the magnets. This configuration allows for greater tolerances between coils and the magnetic cylinder 100.

In certain embodiments, the iron core 110 is positioned concentrically about the center 120 of the magnetic cylinder 100 such that the iron core is an equidistant radially from the interior wall 104, generating a representative flux pattern 101 as illustrated in FIG. 1. The flux fields or lines are drawn to the iron core 110 and compressed or concentrated as it approaches the iron core. The flux fields may then establish what can be visualized as a series of "flux walls" surrounding the iron core which extend throughout the partial cylinder 100 and the exit open ends 114 and 116. Collectively, the partial toroidal magnetic cylinder 100 generates a partially circular magnetic field 125 which is the cumulation of individual flux fields from each magnet. Correspondingly, there will be an open area 115. In FIG. 1, the angle α between the open face 114 of the partial magnetic cylinder 110 and the open face 116 is illustrated in FIG. 1 to be approximately 60 degrees. In other embodiments, the angle α may be between 180 degrees to approaching 0 degrees. Obviously, when the angle is at 180 degrees the open area 115 is larger. When the angle approaches zero, the open area 114 is much smaller. The angle α cannot be zero, however, or the magnetic field 125 would collapse upon itself.

As discussed above, FIG. 1 is a two dimensional section view cut at an angle which is transverse to a longitudinal axis 176 of the center 120 (or center shaft). In addition to the cylindrical walls 102 and 104, there may also be side walls which are not shown in FIG. 1. The side walls join the exterior cylindrical wall 104 to the interior cylindrical wall 104. In certain embodiments, the side walls may be made of a plurality of side wall magnets which contribute to the cumulative magnetic field 125.

Figure 2A:
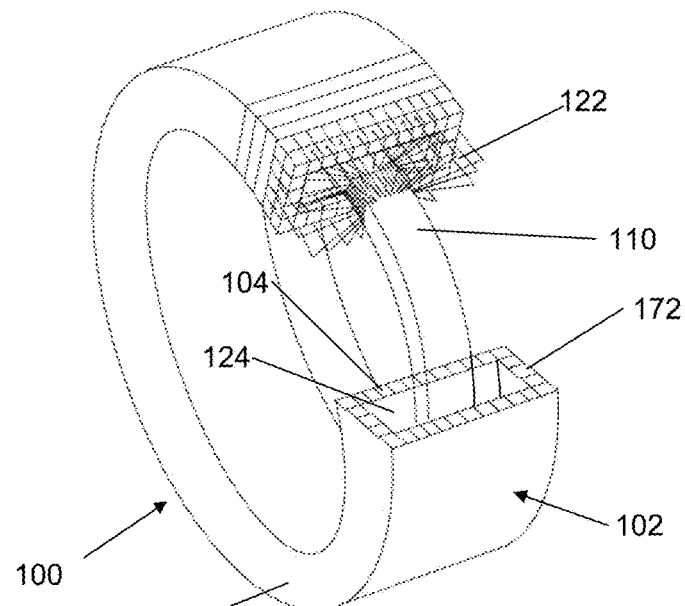
FIG. 2a is an isometric and partial section view of a toroidal magnetic cylinder of FIG. 1.

Turning now to FIG. 2a, there is presented is a conceptual isometric view of the toroidal magnetic cylinder 100 having the central iron core 110 partially positioned within the interior cavity 124 of the partial toroidal magnetic cylinder. As illustrated in FIG. 2a, there is the exterior cylindrical wall 102, the interior cylindrical wall 104, a side wall 170, and an opposing side wall 172. In embodiments, where the side wall 170 and side wall 172 are formed from a plurality of magnets, each magnet in the plurality of magnets have a common magnetic pole with cylindrical walls 102 and 104 which also face the interior cavity 124. For instance, in the embodiment illustrated in FIG. 1, the common magnetic pole (i.e., the north pole) of each magnet of the magnetic cylindrical walls 102 and 104 each point radially towards the interior cavity 124 of the partial toroidal cylinder 100. Consequently, each magnet in the side walls 170 and 172 would also have their north poles facing the interior cavity 124.

The magnets forming the side walls 170 and 172 also produce flux lines. The flux line from the magnets of the side walls 170 and 172 tends to flow from the north pole interior facing pole of the magnetic in a perpendicular manner, around the interior cavity 124 of the partial cylinder 100, through the iron core 110, out either the open end 114 or the open end 116 and into the open space 115, then back around the relevant side wall to south pole on the face of the originating magnet of the side wall. Thus, the side wall magnets also contribute to the flux field 125 generated by the magnets forming the cylinder walls 102 and 104.

Figure 2B:
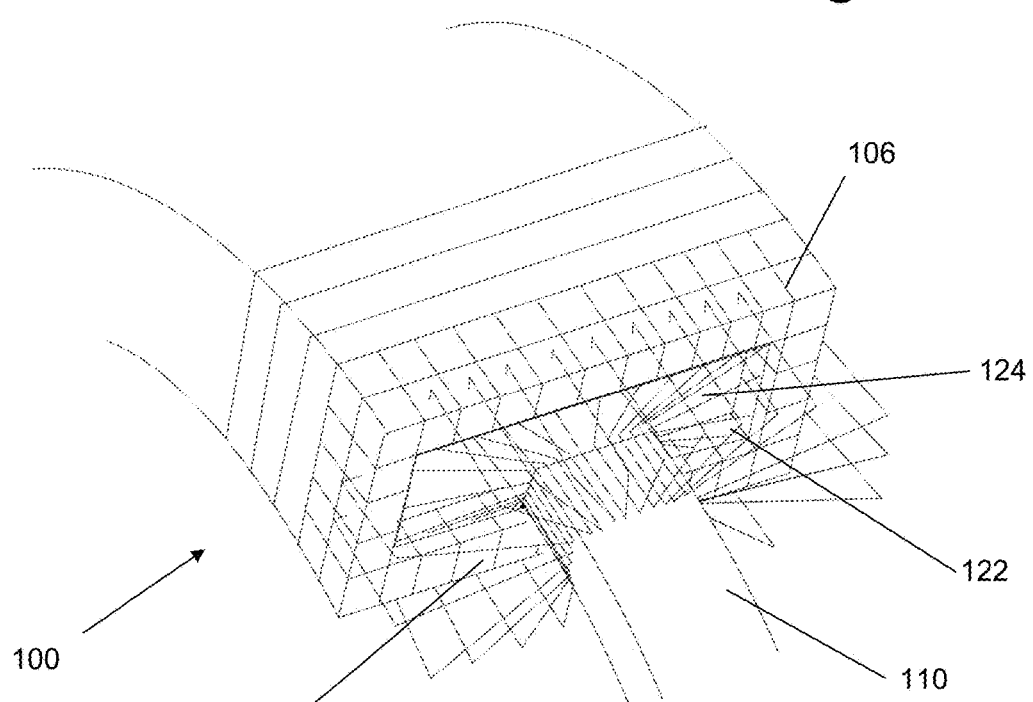
FIG. 2b is a detailed partial section view of the toroidal magnetic cylinder of FIG. 1a illustrating the planar magnetic fields or flux walls generated within the cylinder interior.

FIG. 2b is a detailed partial view of the partial toroidal magnetic cylinder 100 illustrating the planar magnetic fields or "flux walls" 122 generated within the interior cavity 124 of the magnetic cylinder 100 in conjunction with the iron core 110. These are representative illustrations; the actual flux walls 122 or flux fields are dependent on the material design and configuration.

The cylinder 100 as presented in FIGS. 1, 2a and 2b have been conceptualized to illustrate the basic flux lines or paths of a partial magnetic cylinder with an iron core concentrically located in a hollow portion of its walls. From a practical perspective, a core or rotor assembly may position the core 110 within the tunnel formed by the magnetic cylinder 100.

Figure 3:
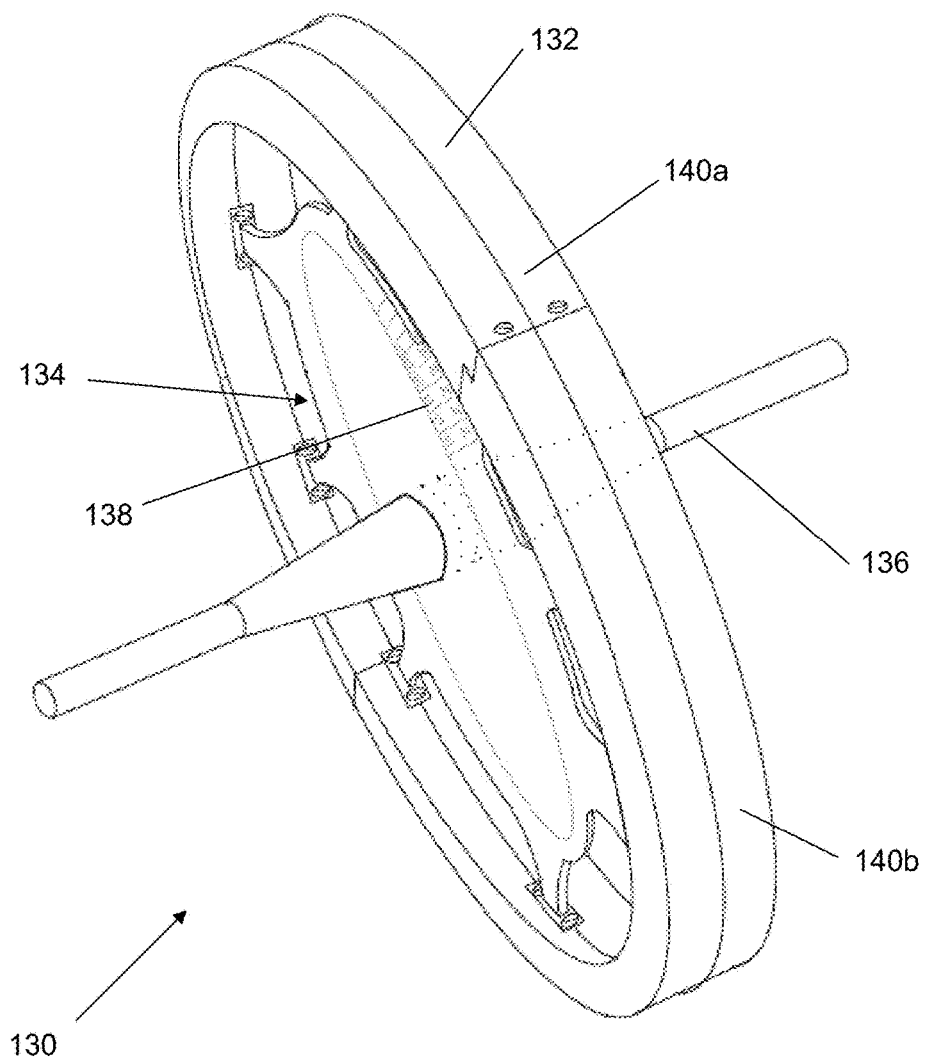
FIG. 3 is a conceptualized isometric view of a rotor hub assembly.

Turning now to FIG. 3, there is presented an isometric view of a one embodiment of an assembly 130 comprising an iron core 132, a rotor hub 134 and shaft 136. The iron core 132 is conceptually similar to the core 110 discussed above. The iron core 132 and the rotor hub 134 are fastened to a shaft 136 using conventional fastening methods known in the art. In certain embodiments the rotor hub 134 may be composed of non-ferrous materials to eliminate the production of eddy currents. When assembled with the partial magnetic cylinder 100, a transverse slot or circumferential (not shown) in the inner wall 104 of the partial magnetic cylinder (not shown in FIG. 3) allows a portion of the rotor hub 134 to extend through the inner wall 104 of the partial magnetic cylinder 100 and into the interior cavity 124 to position the core 132 within the interior cavity of the partial magnetic cylinder (See FIG. 2b).

In other embodiments, the iron core 132 may consist of two or more segments 140a and 140b which may be fastened together to form a complete ring or core. This configuration may have the benefit of allowing a plurality of coils to be built on conventional forms then added to ring segments.

Figure 4:
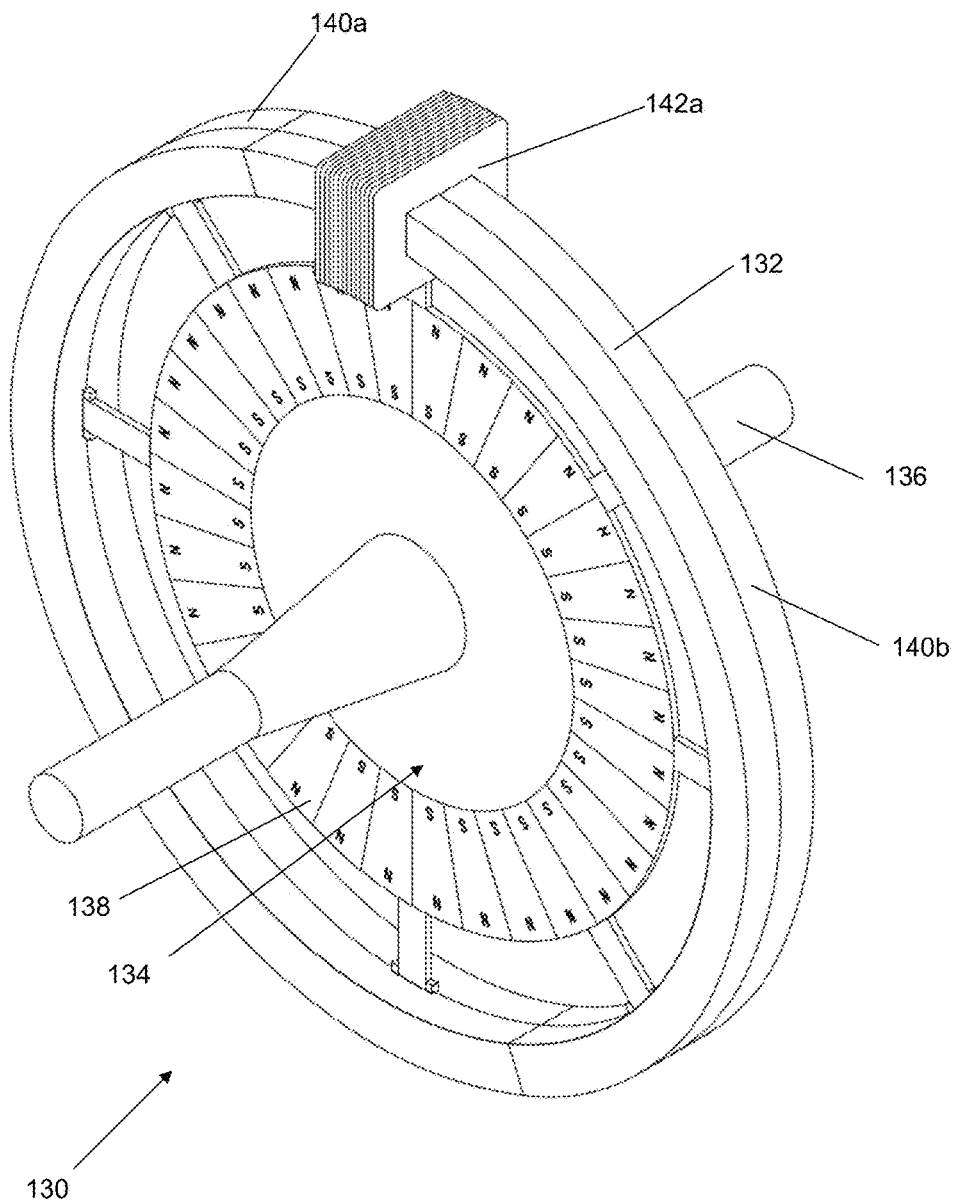
FIG. 4 is a conceptualized isometric view of a rotor hub assembly with a coil positioned on the rotor assembly.
Figure 5:
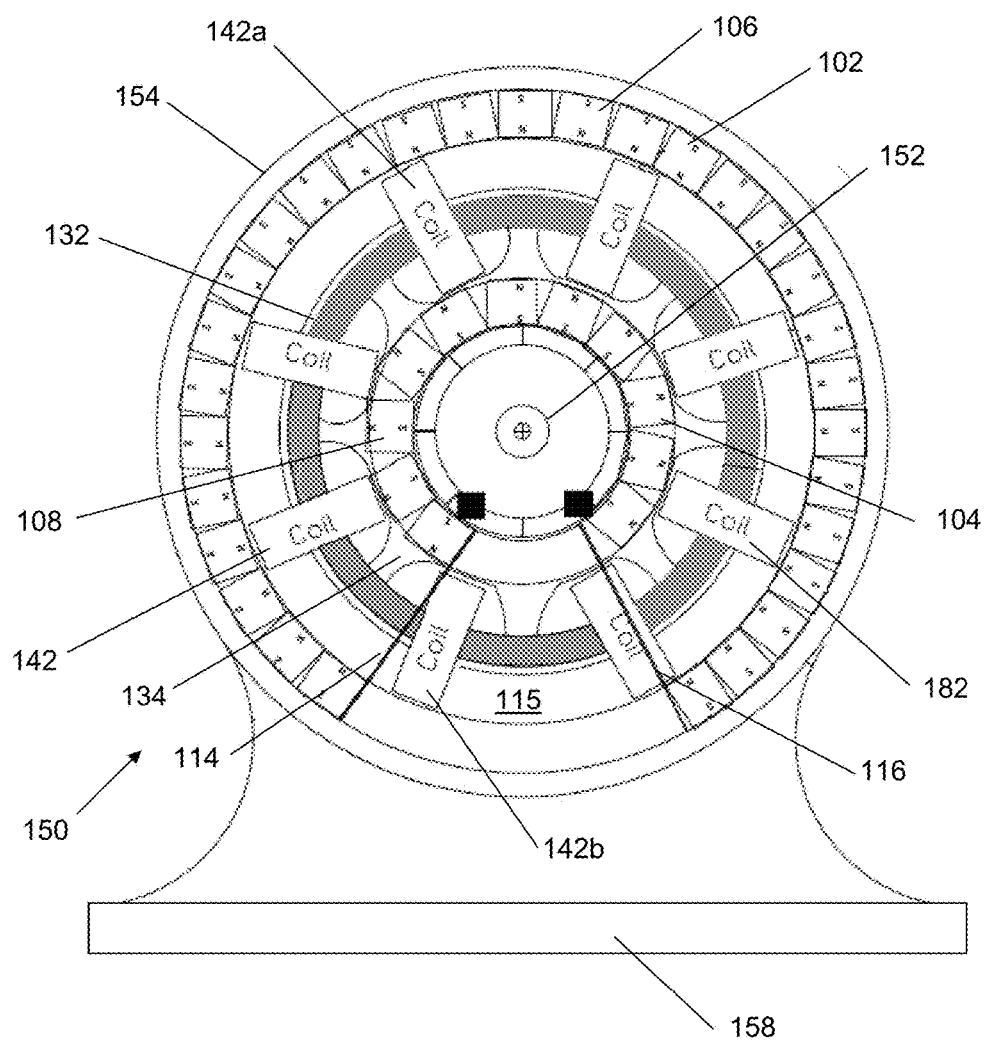
FIG. 5 is a conceptualized lateral section view of an electric motor/generator assembly using the rotor hub assembly illustrating the power terminals and segmented commutator brush assembly configuration.

FIG. 4 illustrates an isometric view of the rotor assembly 130 where the core 132 comprises the core segment 140a and the core segment 140b. A single coil 142a is illustrated and positioned about the core segment 140*b*. In certain embodiments, there may be a plurality of coils 142 rotationally positioned about the core 132 forming as illustrated in FIG. 5. Each individual coil 142*a* may be made from a conductive material, such as copper (or a similar alloy) wire and may be constructed using conventional winding techniques known in the art. In certain embodiments, the individual coils 142*a* may be essentially cylindrical in shape being wound around a coil core (not shown) having a center opening sized to allow the individual coil 142*a* to be secured to the core 132.

The circumferential or transverse slot formed within the interior cylinder wall 104 may allow the flux formed within the tunnel to leak out of the tunnel. This "leakage flux" through the transverse slot may be redirected back into the tunnel by coupling a series or plurality of radial magnets 138 to the rotor hub 134 close to where the rotor hub intersects the transverse slot. The plurality of magnets 138 may be oriented similar to the cylinder magnets 106 of the cylinder 100 (not shown in FIG. 3). In other words, the plurality of magnets 138 may be oriented such that their common poles (i.e., north pole) face the interior cavity 124. In certain embodiments, the plurality of magnets 138 will move with the rotor assembly 130. In yet other embodiments, the plurality of magnets are orientated so they just establish a transverse flux field to redirect the leakage flux back into the tunnel. In certain embodiments, the plurality of magnets may be placed on each side of the hub 134. In yet other embodiments, the plurality of magnets may be placed within the hub 134.

Figure 6:
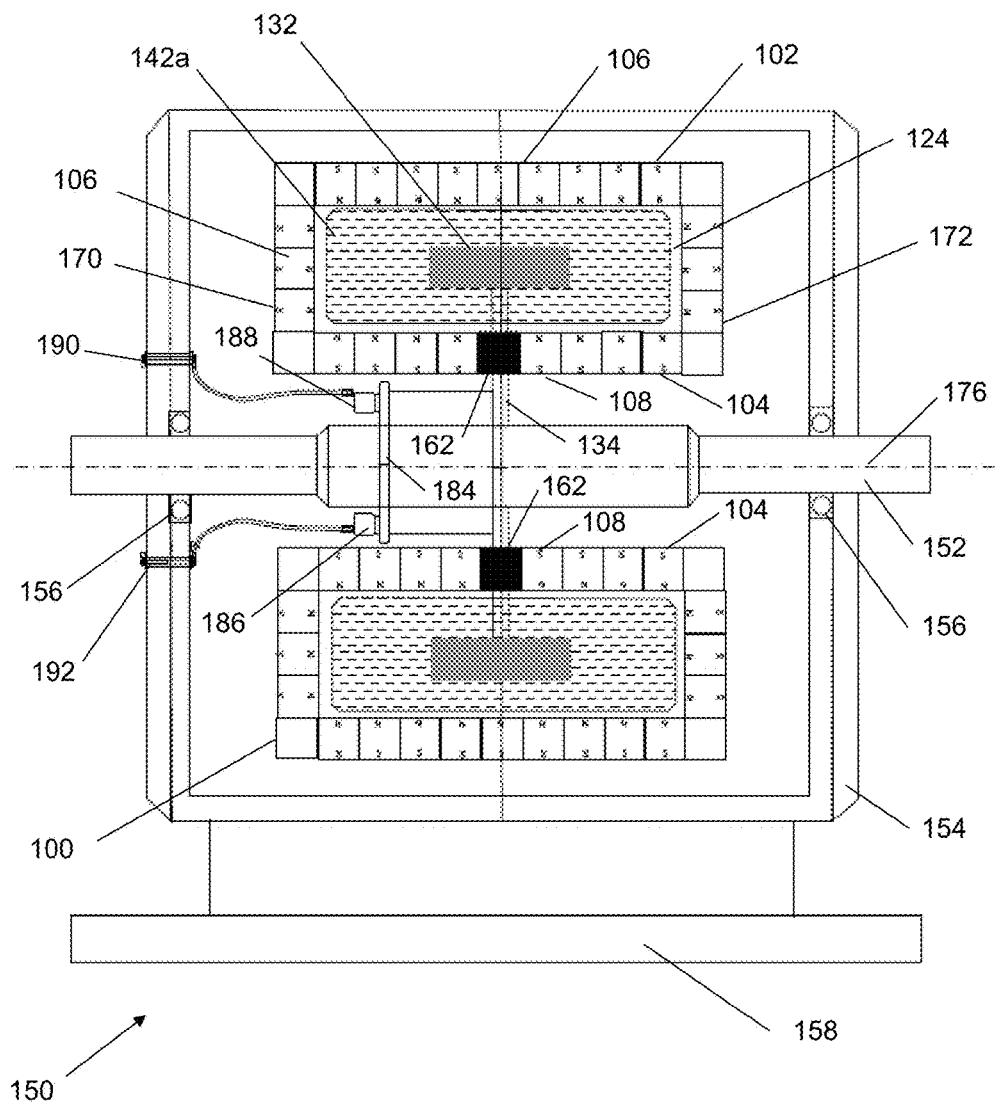
FIG. 6 is a conceptualized longitudinal section view of the electric motor/generator assembly of FIG. 5.
Figure 7:
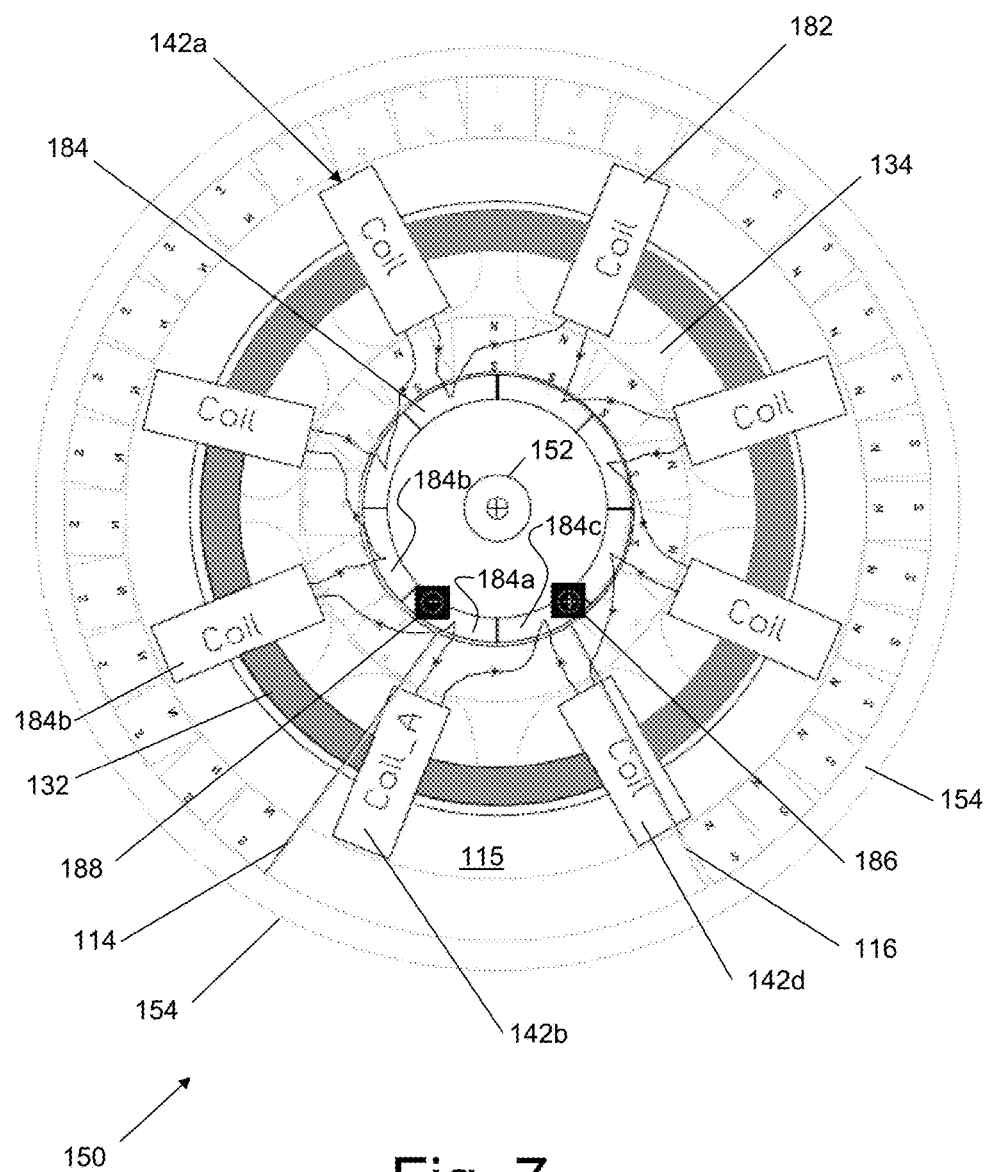
FIG. 7 is a lateral section view illustrating one embodiment of a coupling system between a portion of the coils and the commutator segments which may be used with the electric motor/generator of FIG. 5.

FIG. 5 is a lateral cross-sectional view of one embodiment of an electric motor/generator assembly 150 cut perpendicular to the longitudinal axis 176 which incorporates the partial magnetic cylinder 100 and the rotor hub 134. FIG. 6 is a longitudinal cross-sectional view of the electric motor/generator assembly 150 cut parallel to the longitudinal axis 176. The motor/generator assembly 150 may use components similar to the components discussed above, such as the partial magnetic cylinder 100 and the rotor hub 134. FIG. 7 is a lateral cross-sectional view of one embodiment of an electric motor/generator assembly 150 illustrating additional detail regarding the current paths between individual coils in the plurality of coils 142. (The coils illustrated in FIG. 7 are connected in series but any combination of series or parallel connections are possible. Additional brush locations may be added depending on design needs and criteria.)

In the illustrative embodiment, the motor/generator assembly 150 has a longitudinal shaft 152. In certain embodiments, the longitudinal shaft 152 may be made from an iron or a ferrite compound with similar magnetic properties to iron. In some embodiments, the ferrite compound or powder may be suspended in a viscous material, such as an insulating liquid, a lubricant, motor oil, gel, or mineral oil.

In certain embodiments, there may be an outer casing or housing 154 which provides structural support for the partial magnetic cylinder 100 and the longitudinal shaft 152 (FIG. 6). In certain embodiments, the housing 154 may be formed from any material, alloy, or compound having the required structural strength. In certain embodiments, non-ferrous materials may be used. In some embodiments, external bearings 156 may be used to reduce the friction between the longitudinal shaft 152 and the housing 154 or a similar supporting structure. In certain embodiments, the housing 154 may be coupled to a base 158 to provide for structural support for the housing 154.

As described with respect to FIGS. 1, 2*a* and 2*b*, the partial toroidal magnetic cylinder 100 may comprise a plurality of exterior magnets 106 forming the exterior cylindrical wall 102, a plurality of interior magnets 108 forming the interior cylindrical wall 104. Additionally, there may be the first side wall 170 and the opposing side wall 172 which include a plurality of side exterior magnets 168 (see FIG. 5 6) which contributes to the overall flux field 125 as described above in reference to FIG. 2 to form a closed magnetic cylinder.

In certain embodiments, the core 132 as discussed above is partially positioned concentrically about a longitudinal axis 176 and within the interior cavity 124 of the partial magnetic cylinder 100. As described above, a transverse slot 162 formed within the interior wall 104 of the partial magnetic cylinder 100 allows a portion of the rotor hub 134 to be positioned within the interior cavity 124. The rotor hub 134 is also coupled to the core 132 which is also positioned within the interior cavity 124 of the partial magnetic cylinder 100.

As illustrated in FIG. 5, a plurality of coils 142, such as coil 142*a* are positioned radially about the core 132 to form a coil assembly 182. The windings of each coil 142*a* are generally configured such that they remain transverse to the direction of the relative coil movement within the interior cavity 124. The windings are also transverse with respect to the flux produced by the individual magnets at their interior face as described above. Consequently, the entire winding may be used to generate movement (in motor mode) or voltage (in generator mode). In certain embodiments the space between coils may have an iron or a ferrite compound with similar magnetic properties to iron inserted In some embodiments, the ferrite compound or powder may be suspended in a viscous material, such as an insulating liquid, a lubricant, motor oil, gel, or mineral oil.

This configuration has several inherent advantages: the two interacting magnetic fields are perpendicular to each other, the resulting force is aligned with the direction of motion and almost complete utilization of the flux generated by the permanent magnet configurations in interaction with the coil conductors.

Although a particular number of coils in the plurality of coils 142 are illustrated in FIGS. 5 and 7, depending on the power requirements of the motor/generator assembly, any number of coils could be used to assemble the plurality of coils 142 and the coil assembly 182. In some embodiments, a Gramme ring or series of continuous coils could be used In certain embodiments, as illustrated in FIG. 6 and FIG. 7, a plurality of commutator segments 184 electrically connect the individual coils 142*a* in the coil assembly 182 in series to each other. Other configurations of coil connections, segmented commutators and brush injection/pickup points may be utilized. For example, other embodiments may use two non-segmented commutators and the coils in parallel connection to each other.

In some embodiments, the commutator segments 184 are in electrical communication with a current source via a plurality of brushes, such as brushes 186 and 188 (FIG. 6) which may also be positioned within the casing 154 to provide current to the plurality of coils 142 in the coil assembly 182. In certain embodiments, the brush 186 may be a positive brush and the brush 188 may be the negative brush. In other embodiments, inductive coupling may also be used to transfer power to the coils or vice versa.

When in the "motor mode," electric power is applied to power terminals 190 and 192, certain coils in the plurality of coils 142 move through the partial magnetic cylinder 100 and only "see" "flux walls" similar to the flux walls discussed above in reference to FIG. 2*b*. The plurality of coils 142 are not substantially affected by the direction of flux within the interior cavity 124, thus the plurality of coils move according to the "right hand rule" throughout the cylinder 100. However during the short period of time that certain coils of the plurality of coils 142 are out of the partial magnetic cylinder 100 itself and traveling through the open area or throat 115, it is possible they can also contribute to the torque being produced. During this transition period, the flux is now leaving the interior cavity 124 on its path to the external walls of the partial magnetic cylinder 100 which is in the opposite direction to the flux forces within the partial magnetic cylinder, thus each coil in the plurality of coils 142 may be supplied with a reverse polarity to contribute torque.

At the contact area for the negative brush 188, the current is divided into two paths, one path is back through the plurality of coils within the partial magnetic cylinder 100 itself, the other path is routed through the coils positioned in the open segment 115. Thus, the individual coils in the plurality of coils 142 are automatically provided with the correct polarity as illustrated in FIG. 7.

Take, for example coil 142b, which as is apparent from FIGS. 5 and 7, has just entered the open area 115. From the perspective of coils, voltage is injected via the power terminals 190 and 192 to the brushes 186 and 188. The current splits at the brushes. A portion of the current travels clockwise from a segmented commutator 184 to a coil 142c to the next segmented commutator to the next coil, etc. for the coils and commutator segments that are within the interior cavity 124. The remainder of the current travels counterclockwise from segmented commutator 184c to a coil 142c to the next segmented commutator 184c to the next coil 142d, etc. for coils and commutator segments that are within the open area 115.

For instance, the coil 142b is now positioned in the open area 115 and is rotating around the longitudinal shaft 152 so that it will soon enter the interior cavity 124 at the open end 116 of the partial toroidal cylinder 100. In other words, the coil 142b is about to enter a first portion of the established static magnetic field 125. As described above, the coil 142b receives voltage from the brushes which causes a current to flow within the windings of the coil 142b. As the current flows in the windings, a magnetic field is formed around the windings. This magnetic field of the coil 142b interacts with the magnetic field 125 as the coil is about to enter to open end 116 which causes a motive force on the coil. In turn, the electro-motive force on the coil transfers to the rotor hub 134. The rotation force on the rotor hub 134 is then applied to the longitudinal shaft 152—causing the shaft to rotate.

The coil 142b continues to move through the interior cavity 124 and the flux field therein as long as voltage is applied to the terminal ends of the coil. When the coil 142b rotates completely through the interior cavity 124 and exits the open end 114, the current at the coil is then reversed. This reversal causes a continuation of the previous movement and direction of the coil 142b as the coil moves through the open area 115. This rotational cycle then repeats as the coil 142b continues to rotate about the longitudinal axis 176.

In the generator mode, when the plurality of coils 142 move through the partial magnetic cylinder 100 as a result of the shaft 152 being rotated, the coils within the partial magnetic cylinder only see the "flux walls" (as discussed in reference to FIG. 2b). They may not be affected by the direction of flux within the core, thus the coils produce power throughout their travel through the partial magnetic cylinder 100. However during the short period of time they are out of the cylinder 100 itself and traveling through the open segment 115, it is possible the coils can also contribute to the power being produced. During this transition period when the coils are in the open area 115, the flux is now leaving the iron core 132 on its path to the external walls 102, 104, 170 and 172 of the partial magnetic cylinder 100 which is, however in the opposite direction to the flux forces within the partial magnetic cylinder. Thus, the coil assembly 182 can also produce usable power which can be utilized depending on design needs.

As discussed above, in generator mode, the shaft 152 receives a rotational force from an external rotational force inducing mechanism known in the art (not shown). In response to this rotational force, the shaft begins to rotate. As the rotor hub 134 is coupled to the shaft, the rotor hub also begins to rotate. As discussed above, the rotor hub has a plurality of coils radially spaced around its periphery. For example coil 142b, (see FIGS. 5 and 7) has just entered the open area 115 due to the rotation of the rotor hub 134. From the perspective of the coils, the coil 14b continues to move through the open area 115 until it reaches the first portion of the magnetic field 125.

The coil 142b begins to enter the open end 116 of the partial toroidal magnetic cylinder and rotates through a first portion of magnetic field 125 having concentrated magnetic flux as discussed above. The rotational movement of the coil 142b within the concentrated flux field 125 induces a voltage to appear in the terminal ends of the coil. The voltage causes current to flow through at least two commutator segments 184 and then to the at least two brushes 186 and 188 electrically coupled to an external closed circuit (not shown) via the power terminals 190 and 192.

The continuous movement of the coil 142b within the concentrated flux field 125 continues to induce a voltage to appear in the terminal ends of the coil as the coil moves through the concentrated flux field. The continuous voltage causes a continuous current to flow through at least two commutator segments 184 and then to at least two brushes 186 and 188 electrically coupled to an external closed circuit via the power terminals 190 and 192.

The continued movement of the rotor hub 136, causes the coil 142b to exit the open end 114 of the partial toroidal magnetic cylinder 100 and first portion of the magnetic field 125. The movement of the coil exiting the first portion and entering the open area 115 causes a voltage of an opposite polarity to be induced into the coil 142b and appears in the terminal ends of the coil causing current in the windings of the coil to flow in a reverse direction.

The continuous movement of the coil within the second portion of the concentrated flux field continues to induce a voltage to appear in the terminal ends of the coil. The continuous voltage causing continuous current to flow in the open area through at least two commutator segments 184 and then to at least two brushes 186 and 188 electrically coupled to an external closed circuit via the power terminals 190 and 192.

However, the output voltage from the two brushes does not change polarity at any point due to the commutator effect of the commutator segments 184. Thus, the output is DC.

This rotational cycle then repeats as the coil 142b continues to rotate about the longitudinal axis 176.

Should it be desired to remove the open commutator segments 184 from the circuit, a diode rectifier (not shown) may be added to one side of each coil to limit current flow to a specific direction.

Figure 8A:
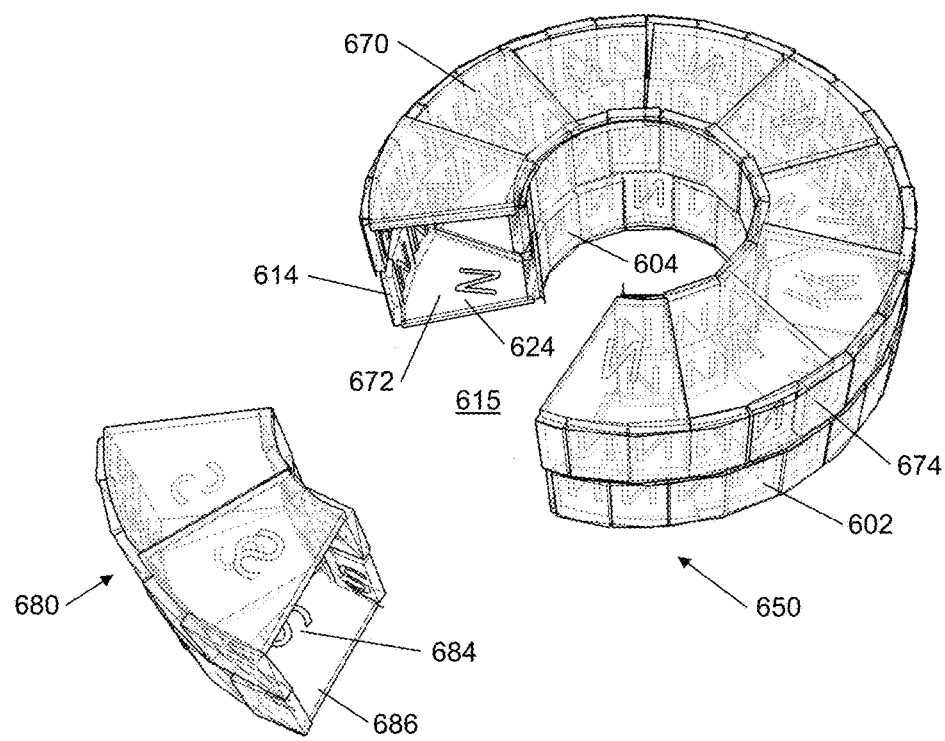
FIG. 8a is an isometric view of a two partial toroidal magnetic cylinders.

FIG. 8a illustrates an alternative partial toroidal magnetic cylinder 650 which is conceptually similar to the partial toroidal magnetic cylinder 100 discussed above in reference to FIGS. 1, 2a and 2b. As illustrated, there is an outer magnetic wall 602 and an inner magnetic wall 604 spaced laterally away from the outer magnetic wall 602. In addition to the partial cylindrical magnetic walls 602 and 604, there may also be magnetic side walls 670 and 672 which oppose each other and are longitudinally spaced from each other. The side walls 670 and 672 in this illustrated embodiment may be made of a plurality of wedge shape members or magnets. The individual magnets in the magnetic walls all have their common or "like" magnetic poles (e.g. north poles) pointing towards an interior 624 (or center) of the partial toroidal magnetic cylinder 650. Although the shapes and number of the individual magnets of the partial toroidal magnetic cylinder 650 are different than the shape and number of individual magnets of the partial toroidal magnetic cylinder 100, the flux lines and magnetic fields are conceptually similar. In other words, the flux lines generated from an individual magnet forming the partial toroidal magnetic cylinder 650 starts, for instance, at its north pole which is facing towards the center or interior 624 (or the "tunnel" formed by the partial toroidal magnetic cylinder 650). The flux lines then are circumferentially channeled through the interior 624 of the partial toroidal magnetic cylinder 650 and flow out an open or terminating end, for instance, the end 614 into a throat or open area 615. The flux lines then follow around the exterior of the partial toroidal magnetic cylinder 650 and back to the south pole of the individual magnet. Such flux line action is described in detail with reference to the partial toroidal magnetic cylinder 100 described above. Thus, the partial toroidal magnetic cylinder 650 generates a flux field which is conceptually similar to the flux field 125 discussed above.

A section cut radially through the outer magnetic wall 602, the inner magnetic wall 604, and the magnetic side walls 670 and 670 would reveal a section of the four walls similar to the end 614 illustrated in FIG. 8A. The center of that section is known as the "sectional center."

The flux lines flow in a partial circular or circumferential manner described above because the toroidal magnetic cylinder 650 is a "closed magnetic cylinder." For instance, if the flux forces from the magnets were not constrained within a circular tunnel, they would tend to take the shortest radial path back to their opposite pole. For instance, the magnet 674 which forms part of the outer cylindrical wall 602 has a north pole facing the interior 624 and a south pole facing the exterior. In open space, flux forces from the magnet 674 tend to flow directly around the magnet from the north to the south pole. However, when the magnet 674 is part of the toroidal magnetic cylinder 650, the arrangement of the other magnets forming the cylinder "bend" the flux forces into a partially circular or circumferential path through the tunnel. In other words, when the magnet 674 is part of the toroidal magnetic cylinder 650, the side wall magnets forming the side walls 670 and 672 bend the flux forces down the tunnel or the interior of the toroidal magnetic cylinder. If there were large gaps between the magnetic walls, the flux forces would flow radially out of the tunnel and the cylinder would not be considered a magnetically "closed" cylinder.

In some embodiments, when the partial toroidal magnetic cylinder 650 is designed to act as part of a rotor, it may be preferable to have a portion of the throat or the open area 615 filled with weights so to balance the mechanical rotation of the partial toroidal magnetic cylinder 650 when it turns about its center axis. In certain embodiments, a plurality of magnets may be used as balancing weights and/or to contribute to the overall power or current produced. If magnets are used in the throat 615, their polarities are reversed so as to not collapse the magnetic field created by the partial toroidal magnetic cylinder 650. In other words, two partial toroidal magnetic cylinders are used to form a single toroidal magnetic cylinder which may be used as a rotor or portion of a rotor.

A second partial toroidal magnetic cylinder 680 is designed to "fit" within the open area 615. The flux field generated by the second partial toroidal magnetic cylinder 680 is conceptually similar in shape to the flux field generated by the first partial toroidal magnetic cylinder 650 or 100 (discussed above in reference to FIG. 1). Specially, the flux lines from the magnets forming the second partial toroidal magnetic cylinder 680 run inward from the face of the magnets, then are channeled through the interior 684 or "tunnel" of the partial toroidal magnetic cylinder 680 and flow out an open or terminating end, for instance, the end 686. The flux lines then follow around the exterior of the partial toroidal magnetic cylinder 680 and back to the opposing pole of the individual magnet.

Figure 8B:
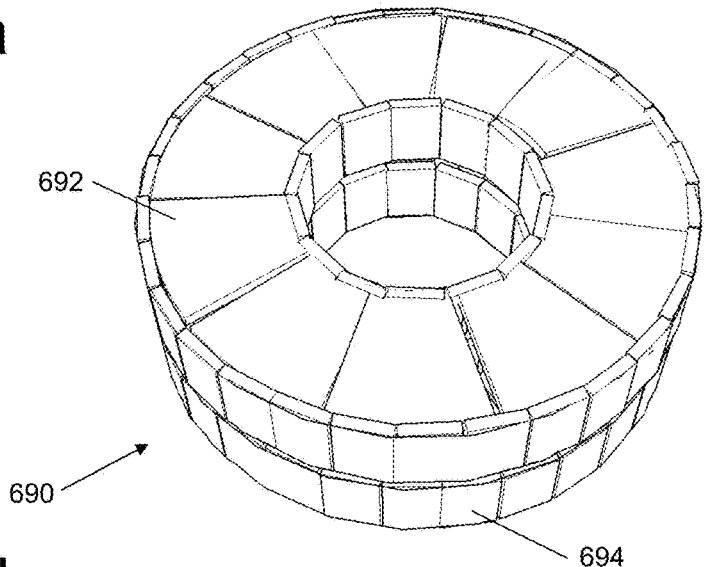
FIG. 8b is an isometric view of the two partial toroidal magnetic cylinders of FIG. 8a joined together to form a complete toroidal magnetic cylinder.

FIG. 8b illustrates a complete toroidal magnetic cylinder 690 formed from combining the two partial toroidal magnetic cylinders 650 and 680 where the partial toroidal magnetic cylinders each have opposite magnetic polarities and magnetic fields. The flux field formed by the partial toroidal magnetic cylinder 680 is said to have an opposite polarity from the flux field formed by the partial toroidal magnetic cylinder 650. In other words, the magnets of the partial toroidal magnetic cylinder 680 are positioned such that their like poles are in an opposite direction from the magnets forming the partial toroidal magnet cylinder 650. For instance, the like poles (e.g., the north poles) of the magnets forming the partial toroidal magnetic cylinder 650 all face inward towards the tunnel 624. In contrast, the like poles (e.g., the north poles) of the magnets forming the partial toroidal magnetic cylinder 680 all face outward away from the tunnel 684. Obviously, with regard to the partial toroidal magnetic cylinder 650, it does not matter whether the north poles of the magnets face inward or the south poles face inward as long as the magnets forming the partial toroidal magnetic cylinder 680 have their respective like poles reversed.

In certain embodiments, the toroidal magnetic cylinder 690 may be assembled in longitudinal portions or halves and then joined together to form the complete cylinder.

Figure 9A:
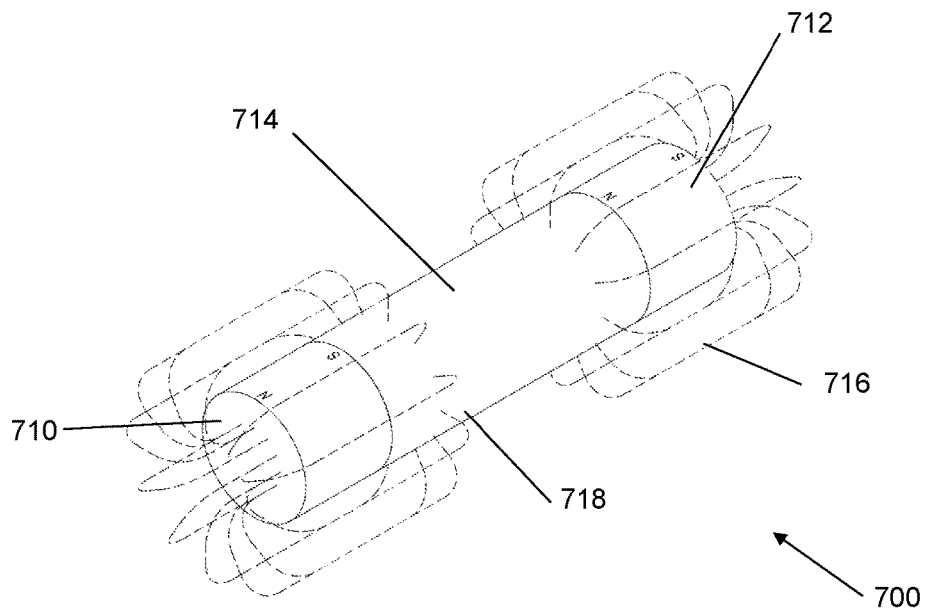
FIG. 9a is an isometric view of a flux or magnetic field concentrator which could be used with various embodiments disclosed herein.
Figure 9B:
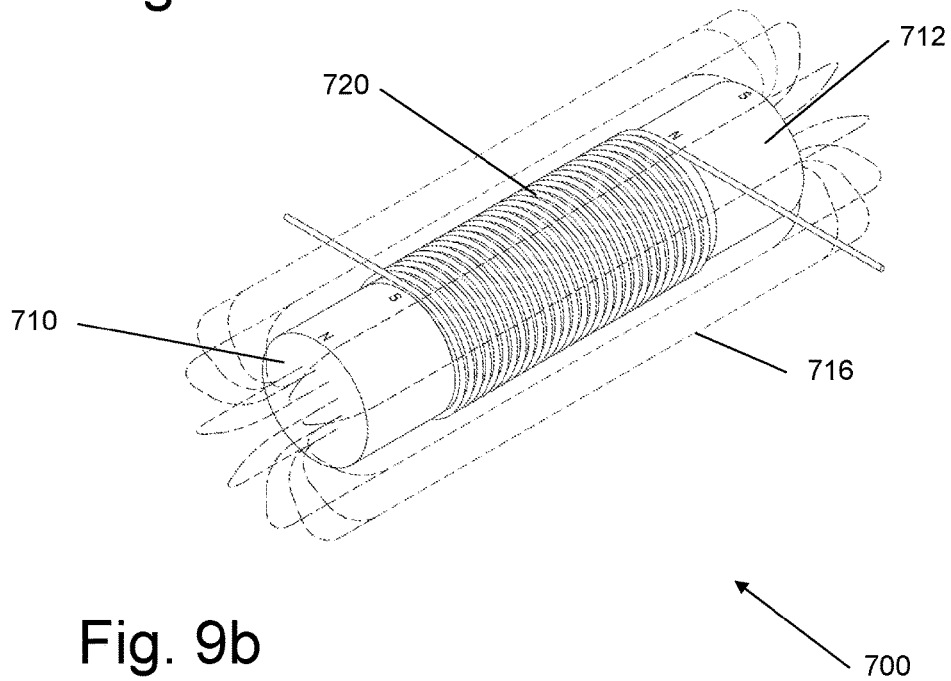
FIG. 9b is an isometric view of an improved flux or magnetic field concentrator which could be used with various embodiments disclosed herein

FIGS. 9a and 9b illustrate a hybrid electromagnet magnet assembly 700 which may be incorporated in certain aspects of the above magnetic cylinders to concentrate the magnetic fields. Additionally, iron cores or similar materials may also be used with the magnetic cylinders to concentrate the magnetic fields as described above.

In certain embodiments, the magnet assembly 700 comprises at least two or more commercially available permanent magnets 710 and 712 positioned on either end of an iron core 714. In the illustrated embodiment a cylinder shape has been selected but any shape may be constructed in any suitable configuration.

FIG. 9a illustrates conceptual flux lines 716 of the hybrid magnet assembly 700. One skilled in the art may see that though some of the aligned magnetic domains will contribute to flux lines 716 exiting the permanent magnets pole faces, however, most will "leak" out of the core side walls 718.

FIG. 9b illustrates the hybrid magnet assembly 700 with a spirally wrapped a conductive material 720 carrying a current. As illustrated, the conductor 720 confines and concentrates all the flux lines 716 to align any magnetic domains not aligned by the permanent magnets. This addition allows the creation of much stronger magnetic flux outputs at a lower ampere turn levels than conventional iron core coils.

Thus, such "hybrid" magnet assemblies can also be used to assist in the concentration of flux force lines in the partial magnetic cylinders discussed above.

In summary, certain aspects of the various disclosed embodiments may provide the following benefits:

Unlike conventional brush rectified or PWM controller motor/generators, the coils in aspects of this invention are in continuous contact with the Permanent Magnet field and thus produce a non-varying continuous torque or output.

Complex PWM drives and controllers, commutators, etc (and the associated losses) may not be not required since certain aspects of the invention produce and utilize DC current directly.

If automatic speed control for a given load is required, complex position indication is not required. A much simpler RPM indication and a varying voltage/current relationship is all that is required.

Using the magnetic cylinder/single pole magnet assembly concept utilizing permanent magnets an otherwise unachievable, extremely strong magnetic field is generated without consuming any electrical power.

Though a Counter EMF field is produced by any induced current flow, due to the magnet cylinder and core design there is no direct impact on coil movement that hinders such movement.

Iron Hysteresis losses are essentially eliminated as any particular point on the core only experiences a hysteresis loss twice per revolution.

Eddy current losses are essentially eliminated as the core does not move perpendicular to the flux lines Cogging is also essentially eliminated as the core forces are balanced and equal in all directions There is little inrush current as there is no need to saturate large masses of iron 100% of the copper windings in the coil is utilized to take advantage of Lorentz forces thus there is no wasted copper winding as in conventional motor/generators.

Inductive kickback from the rising and collapsing sinusoidal waveform is eliminated Like other DC motors reversal of torque is simply a reversal of input polarities The foregoing description of the embodiments of the invention has been presented for the purposes of illustration and description. It is not intended to be exhaustive or to limit the invention to the precise form disclosed. Many combinations, modifications and variations are possible in light of the above teaching. Undescribed embodiments which have interchanged components are still within the scope of the present invention. It is intended that the scope of the invention be limited not by this detailed description, but rather by the claims appended hereto.

The invention claimed is:

1. A DC generator/motor, comprising:
  a stator, comprising
    a first partial toroidal magnetically closed tunnel enclosing a first portion of a circular rotation path, the first partial toroidal magnetically closed tunnel defined by
    a first partial circular magnetic wall positioned about a longitudinal axis having a first circumferential slot defined therein,
    a first partial opposing circular magnetic wall positioned at a predetermined lateral distance from the first circular magnetic wall,
    a first magnetic side wall positioned within the lateral distance, and
    a first opposing side wall positioned at a first longitudinal distance from the first magnetic side wall and within the lateral distance;
    wherein the first magnetic circular wall, the first opposing magnetic circular wall, the first side wall, and the first opposing side wall each have a surface and a corresponding magnetic pole of a first polarity that points towards an interior of the first partial magnetically closed tunnel that generates flux forces within the partial magnetically closed tunnel;
  a rotor comprising
    a center shaft positioned along the longitudinal axis;
    a rotor hub coupled to the center shaft and having a portion sized to rotate within the first circumferential slot;
    a plurality of coils coupled to the rotor hub and positioned radially about the rotor hub such that the plurality of coils are moveable along the circular rotation path; and
    a plurality of magnets fixedly coupled to the rotor hub and positioned proximal to the first circumferential slot, the plurality of magnets having a polarity orientated to redirect flux forces back into the first partial toroidal magnetically closed tunnel.

2. The DC generator/motor of claim 1, wherein the first partial toroidal magnetically closed tunnel has an arc length of greater than 180 degrees.

3. The DC generator/motor of claim 1, wherein flux forces generated by the first partial toroidal magnetically closed tunnel flow from interior faces of the partial toroidal magnetically closed tunnel towards the interior of the first partial toroidal magnetically closed tunnel, then flow in a direction generally parallel to the first portion of the circular rotation path.

4. The DC generator/motor of claim 1, wherein the plurality of magnets fixedly coupled to the rotor hub are positioned along a center axis of the rotor hub.

5. The DC generator/motor of claim 1, further comprising a plurality of commutator segments electrically connecting the individual coils of the plurality of coils to each other in series.

6. The DC generator/motor of claim 5, further comprising a plurality of brushes mechanically coupled to the stator and in electrical communication with the commutator segments.

7. The DC generator/motor of claim 1, wherein a space radially and laterally adjacent to the first partial toroidal magnetically closed tunnel forms a throat.

8. The DC generator/motor of claim 7, wherein a second partial toroidal magnetically closed tunnel is positioned within the throat.

9. The DC generator/motor of claim 7, wherein a partial toroidal nonmagnetic tunnel is positioned within the throat.

10. A generator/motor, comprising:
  a stator, comprising
    a first partial toroidal magnetically closed tunnel enclosing a first portion of a circular rotation path, the first partial toroidal magnetically closed tunnel defined by
    a first partial circular magnetic wall positioned about a longitudinal axis having a first circumferential slot defined therein,
    a first partial opposing circular magnetic wall positioned at a predetermined lateral distance from the first circular magnetic wall,
    a first magnetic side wall positioned within the lateral distance, and a first opposing side wall positioned a first longitudinal distance from the first magnetic side wall and within the lateral distance;
wherein the first magnetic circular wall, the first opposing magnetic circular wall, the first side wall, and the first opposing side wall each have a surface and a corresponding magnetic pole of a first polarity that points towards an interior of the first partial magnetically closed tunnel;
a second partial toroidal magnetically closed tunnel enclosing a second portion of the circular rotation path, the second partial toroidal magnetically closed tunnel defined by
a second partial circular magnetic wall positioned about the longitudinal axis having a second circumferential slot defined therein,
a second partial opposing circular magnetic wall positioned at a predetermined lateral distance from the second circular magnetic wall,
a second magnetic side wall positioned within the lateral distance,
a second opposing side wall positioned within the lateral distance;
wherein the second magnetic circular wall, the second opposing magnetic circular wall, the second side wall, and the second opposing side wall each have a surface and a corresponding magnetic pole of a second polarity that faces towards an interior of the second partial magnetically closed tunnel;
wherein the magnetic pole of a first polarity is opposite from the magnetic pole of the second polarity and the first partial toroidal magnetically closed tunnel has an arc length of greater than 180 degrees and the second partial toroidal magnetically closed tunnel has an arc length of less than 180 degrees;
a rotor comprising
a center shaft positioned along the longitudinal axis;
a rotor hub coupled to the center shaft and having a portion sized to rotate within the first circumferential slot and the second circumferential slot; and
a plurality of coils coupled to the rotor hub and positioned radially about the rotor hub along the circular rotation path.

11. The generator/motor of claim 10, further comprising a plurality of magnets fixedly coupled to the rotor hub and positioned proximal to the first circumferential slot or the second circumferential slot, the plurality of magnets having a polarity orientated to redirect flux forces flowing back into either the first partial toroidal magnetically closed tunnel or the second partial toroidal magnetically closed tunnel.

12. The generator/motor of claim 10, wherein flux forces generated by the first partial toroidal magnetically closed tunnel flow from interior faces of the partial toroidal magnetically closed tunnel towards the interior of the first partial toroidal magnetically closed tunnel, then flow in a direction generally parallel to the first portion of the circular rotation path.

13. The generator/motor of claim 10, wherein flux forces generated by the second partial toroidal magnetically closed tunnel flow from interior faces of the partial toroidal magnetically closed tunnel towards the interior of the second partial toroidal magnetically closed tunnel, then flow in a direction generally parallel to the second portion of the circular rotation path.

14. The generator/motor of claim 10, further comprising a plurality of commutator segments electrically connecting the individual coils of the plurality of coils to each other in series.

15. The generator/motor of claim 10, further comprising a plurality of brushes in electrical communication with the commutator segments.

16. A method of generating current, the method comprising:
providing a circular rotation path,
generating a first concentrated magnetic field along a first portion of the circular rotation path by a first closed toroidal magnetic tunnel positioned around the first portion of the circular rotation path; the first closed toroidal magnetic tunnel defined by
a first circular magnetic wall having a first circumferential slot defined therein,
a first opposing circular magnetic wall positioned at a predetermined lateral distance from the first circular magnetic wall,
a first side wall positioned within the lateral distance,
a first opposing side wall positioned within the lateral distance;
wherein the first magnetic circular wall, the first opposing magnetic circular wall, the first side wall, and the first opposing side wall each have a surface and a corresponding magnetic pole of a first polarity that points towards a sectional center of the first closed magnetic tunnel for generating magnetic flux forces;
coupling at least one coil to a shaft via a coil assembly hub wherein a portion of the coil assembly hub is sized to pass through the circumferential slot;
redirecting magnetic flux forces back into the first closed toroidal magnetic tunnel by positioning at least one magnet close to the circumferential slot wherein the at least one magnet is coupled to the coil assembly hub;
moving at least one coil along the circular rotation path into the first concentrated magnetic field wherein the at least one coil has windings of an conductive material which are wound generally perpendicular to a movement of the coil;
generating direct current of a first direction within the windings when the at least one coil is moving within the first concentrated magnetic field;
extracting the direct current from the at least one coil through a first current path comprising at least two commutator segments electrically connected to at least two brushes;
moving the at least one coil along the circular rotation path into a second concentrated magnetic field positioned radially adjacent to the first concentrated magnetic field, wherein the second concentrated magnetic field is generated by a second closed toroidal magnetic tunnel positioned around a second portion of the circular rotation path, the second closed toroidal magnetic tunnel defined by
a second circular magnetic wall having a second circumferential slot defined therein,
a second opposing circular magnetic wall positioned at a second predetermined lateral distance from the second magnetic wall,
a second side wall positioned within the second lateral distance, and
a second opposing side wall positioned within the second lateral distance;
wherein the second magnetic circular wall, the second opposing magnetic circular wall, the second side wall, and the second opposing side wall each have a surface and a second corresponding magnetic pole of a second polarity that points towards a sectional center of the second closed magnetic tunnel for generating a second plurality of magnetic flux forces;

redirecting magnetic flux forces back into the second closed toroidal magnetic tunnel by positioning at least one magnet close to the circumferential slot wherein the at least one magnet is coupled to the coil assembly hub;

generating a second direct current of a second direction within the windings when the at least one coil is moving within the second concentrated magnetic field; and extracting the second direct current from the at least one coil when the at least one coil is within the second concentrated magnetic field.

17. The method of claim 16, wherein the flux forces within the first closed toroidal magnetic tunnel flow from interior faces of the first closed toroidal magnetic tunnel towards the sectional center of the first closed toroidal magnetic tunnel, then flow in a direction generally parallel to a portion of the circular rotation path.

18. The method of claim 16, wherein the flux forces within the second closed toroidal magnetic tunnel flow from interior faces of the second closed magnetic tunnel towards the sectional center of the second closed magnetic tunnel, then flow in a direction generally parallel to a portion of the circular rotation path.

19. The method of claim 16, wherein the first closed toroidal magnetic tunnel has an arc length of at least 180 degrees.

* * * * *